Patented May 23, 1933

1,910,799

UNITED STATES PATENT OFFICE

GEORGE F. KENNEDY, OF NEWBURYPORT, MASSACHUSETTS, ASSIGNOR TO HERCULES POWDER COMPANY, OF WILMINGTON, DELAWARE, A CORPORATION OF DELAWARE

CORE OIL

No Drawing. Original application filed August 10, 1928, Serial No. 298,867. Divided and this application filed December 4, 1931. Serial No. 579,119.

My invention relates to a method for preventing the crystallization of abietic acid and rosin, as such, or where compounded with other materials, as for example, in core oils, printing inks, etc.

As is well known abietic acid and rosin, both gum rosin and wood rosin, have a tendency to crystallize and will crystallize in time, as when they are stored or when they are compounded with other materials, as for example, in core oils. The presence of crystals in abietic acid or in rosin is a serious objection to their use, since when crystallized they have a higher melting point than when uncrystallized and when crystallized they will enter into reaction with other materials much more slowly than when uncrystallized. Further, the tendency of abietic acid and rosin to crystallize will cause them to crystallize out of compositions in which they are included, such as core oils.

Now, in accordance with my invention I provide a method for the treatment of abietic acid and rosin as a result of which crystallization thereof is prevented, or desirably retarded.

In accordance with my invention, I have discovered that crystallization of abietic acid and rosin may be prevented or desirably retarded by subjecting the abietic acid or rosin to partial oxidation, which may be accomplished, for example, by blowing with air or subjecting them to treatment with an oxidizing agent. When the partial oxidation of the abietic acid or rosin is effected by blowing with air, the substance under treatment may, for example, be in solution in a suitable solvent such, for example, as gasoline, and the air blown through the solution, or as dissolved, for example, in linseed oil for the production of a core oil. Where air is blown through a solution of abietic acid or rosin, the solvent carried off by the air in the form of vapor is condensed and the partially oxidized abietic acid or rosin is recovered from the solution by evaporation off of the solvent. The abietic acid or rosin may be blown with air while in a molten condition, and preferably maintained at a temperature of from about 100° C. to about 250° C., for a period of time depending upon the temperature, volume of air and degree of contact with the air, and degree of retardation of tendency to crystallize desired. For example, abietic acid or rosin, after air blowing for about eight hours, while maintained at a temperature of about 200° C., will be found to have a greatly reduced tendency to crystallize, as compared with untreated abietic acid or rosin. Air blowing for a shorter period than eight hours, say four hours, or at a temperature lower than 200° C., will give an improved abietic acid or rosin and air blowing for a longer period than eight hours will still further decrease the tendency of the abietic acid or rosin to crystallize. The air blowing of abietic acid or rosin will also have the effect of reducing the acid number thereof.

By way of illustration of the treatment, for example, of rosin for its partial oxidation, the rosin may be treated in solution, for example, in an ingredient of core oil, as linseed oil. For example, in the production of a core oil 40 parts of rosin dissolved in 30 parts of linseed oil are blown with air for say 12 hours at a temperature of say 150° C. and the necessary amount of kerosene oil then added. Abietic acid may be treated similarly.

The partial oxidation of abietic acid or rosin may, as has been indicated, be effected by treatment with, for example, oxygen, air, or other gas containing oxygen, or with small amounts of ozone, or by treatment with a reagent which liberates oxygen such as potassium permanganate, sodium bichromate, etc.

As illustrative of the retardation of the tendency of, for example, rosin to crystallize, a core oil, comprising 30 parts linseed oil, 30 parts of kerosene oil and 40 parts of rosin, which has been previously blown with air for about eight hours, while maintained at a temperature of 200° C., and the acid number of which will be found to have been reduced from about 155 to about 147, will not crystallize after standing at room temperature for five weeks, where a similar core oil containing untreated rosin will begin to crystallize in six days. A core oil as above, containing rosin which has been air blown for a period of about four hours, will resist crystallization for about twelve days.

It will be understood that my invention contemplates fundamentally preventing or retardation of the tendency of abietic acid and rosin to crystallize by partial oxidation of the abietic acid or rosin however effected and that my invention is applicable to abietic acid and to both gum and wood rosin, which, as is well known, are impure forms of abietic acid.

I have not herein claimed the method for preventing the crystallization of abietic acid and rosin described, since such forms the subject matter of an application for United States Letters Patent filed by me Serial No. 298,867, filed August 10, 1928, and of which this application is a division.

What I claim and desire to protect by Letters Patent is:

1. A core oil substantially resistant to crystallization, which includes abietic acid, which has been subjected to treatment to effect its partial oxidation and a petroleum oil as ingredients.

2. A core oil substantially resistant to crystallization, which includes rosin, which has been subjected to treatment to effect its partial oxidation and a petroleum oil as ingredients.

3. A core oil substantially resistant to crystallization, which includes as ingredients linseed oil, a petroleum distillate and abietic acid which has been subjected to treatment to effect its partial oxidation.

4. A core oil substantially resistant to crystallization, which includes as ingredients linseed oil, a petroleum distillate and rosin which has been subjected to treatment to effect its partial oxidation.

In testimony of which invention, I have hereunto set my hand, at Newburyport, Mass., on this 24th day of November, 1931.

GEORGE F. KENNEDY.